United States Patent
Song et al.

(10) Patent No.: US 10,796,196 B2
(45) Date of Patent: Oct. 6, 2020

(54) LARGE SCALE IMAGE RECOGNITION USING GLOBAL SIGNATURES AND LOCAL FEATURE INFORMATION

(71) Applicant: Nant Holdings IP, LLC, Culver City, CA (US)

(72) Inventors: Bing Song, La Canada, CA (US); Liwen Lin, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 253 days.

(21) Appl. No.: 15/063,209

(22) Filed: Mar. 7, 2016

(65) Prior Publication Data
US 2016/0259815 A1    Sep. 8, 2016

Related U.S. Application Data

(60) Provisional application No. 62/128,976, filed on Mar. 5, 2015.

(51) Int. Cl.
G06F 16/00    (2019.01)
G06K 9/62     (2006.01)
G06K 9/46     (2006.01)

(52) U.S. Cl.
CPC ......... G06K 9/6201 (2013.01); G06K 9/4676 (2013.01)

(58) Field of Classification Search
CPC .............................................. G06F 17/30247
See application file for complete search history.

(56) References Cited

U.S. PATENT DOCUMENTS 6,711,293 B1    3/2004 Lowe
7,657,100 B2    2/2010 Gokturk et al.
(Continued)

FOREIGN PATENT DOCUMENTS

CN      102063472 A     5/2011
WO   WO 2013/056315 A1   4/2013

OTHER PUBLICATIONS

Douze et al., "Combining attributes and Fisher vectors for efficient image retrieval", CVPR 2011—IEEE Conference on Computer Vision & Pattern Recognition, Jun. 2011, IEEE, 9 pages.
(Continued)

*Primary Examiner* — Hung Q Pham
(74) *Attorney, Agent, or Firm* — Mauriel Kapouytian Woods LLP; Elaine K. Lee; Andrew A. Noble

(57) ABSTRACT

Techniques are provided that include receiving one or more global signatures for a query image in response to an image recognition query, wherein some of the plurality of global signatures are generated using local descriptors corresponding to different cropped versions of the image. A ranking order is determined for a plurality of document images based on nearest neighbor relations between document signatures corresponding to the plurality of document images and each one of the one or more global signatures for the query image. A subset of the plurality of document images is selected based on the determined ranking order. Additional document data corresponding to the selected subset of the plurality of document images is obtained, and a search result is generated based on a geometric verification between the additional document data corresponding to the selected subset of the plurality of document images and the query image.

38 Claims, 8 Drawing Sheets

(56) References Cited

U.S. PATENT DOCUMENTS

| | | | |
|---|---|---|---|
| 7,680,341 | B2 | 3/2010 | Perronnin |
| 7,783,135 | B2 | 8/2010 | Gokturk et al. |
| 8,139,900 | B2 | 3/2012 | Gokturk et al. |
| 8,370,338 | B2 * | 2/2013 | Gordo .............. G06F 17/30247 707/723 |
| 8,428,397 | B1 * | 4/2013 | Brandt ................ G06K 9/6272 382/195 |
| 8,489,585 | B2 | 7/2013 | Larlus et al. |
| 8,630,513 | B2 | 1/2014 | Gokturk et al. |
| 8,712,862 | B2 | 4/2014 | Gokturk et al. |
| 8,732,025 | B2 | 5/2014 | Gokturk et al. |
| 8,768,049 | B2 | 7/2014 | Wang et al. |
| 8,768,313 | B2 | 7/2014 | Rodriguez |
| 8,879,796 | B2 | 11/2014 | Serrano |
| 8,983,201 | B2 | 3/2015 | Cai et al. |
| 9,135,715 | B1 * | 9/2015 | Klingner ................. G06T 7/20 |
| 9,547,807 | B2 | 1/2017 | Calleja et al. |
| 9,552,524 | B2 | 1/2017 | Artan et al. |
| 9,830,631 | B1 * | 11/2017 | Dhua ............... G06K 9/6202 |
| 9,864,928 | B2 | 1/2018 | Bober et al. |
| 10,075,695 | B2 * | 9/2018 | Shen ..................... G06T 7/73 |
| 2011/0158533 | A1 * | 6/2011 | Gutelzon .......... G06F 17/30259 382/176 |
| 2011/0286628 | A1 * | 11/2011 | Goncalves ........ G06F 17/30256 382/103 |
| 2012/0283574 | A1 | 11/2012 | Park et al. |
| 2013/0105567 | A1 * | 5/2013 | Choi ................ G06F 17/30876 235/375 |
| 2013/0129223 | A1 * | 5/2013 | Takacs ................... A61B 3/032 382/195 |
| 2013/0202213 | A1 | 8/2013 | Adamek et al. |
| 2014/0019489 | A1 | 1/2014 | Wang et al. |
| 2014/0195560 | A1 * | 7/2014 | Xin ...................... G06F 16/583 707/772 |
| 2014/0254934 | A1 * | 9/2014 | Laxminarayana Bhat ........... G06F 17/30265 382/173 |
| 2014/0369626 | A1 | 12/2014 | Gokturk et al. |
| 2015/0011194 | A1 | 1/2015 | Rodriguez |
| 2015/0043814 | A1 * | 2/2015 | Gu .................... G06K 9/00671 382/165 |
| 2015/0043828 | A1 * | 2/2015 | Valente .................. G06K 9/46 382/201 |
| 2015/0046483 | A1 * | 2/2015 | Liu ..................... G06K 9/6215 707/758 |
| 2015/0049955 | A1 * | 2/2015 | Stoeffler .............. G06K 9/6202 382/220 |
| 2015/0139485 | A1 * | 5/2015 | Bourdev ............ G06K 9/00362 382/103 |
| 2015/0262036 | A1 | 9/2015 | Song et al. |
| 2016/0259816 | A1 | 9/2016 | Song |

OTHER PUBLICATIONS

Zobel et al., "Inverted Files for Text Search Engines", ACM Computing Surveys, Jul. 2006, vol. 38, No. 2, Article 6 , 56 pages.

Jegou et al., "Triangulation embedding and democratic aggregation for image search", CVPR—International Conference on Computer Vision and Pattern Recognition (2014), 12 pages.

Jegou et al., "Aggregating local descriptors into a compact image representation", 2010 IEEE Conference on Computer Vision and Pattern Recognition (CVPR), 8 pages.

Arandjelovic et al., "Three things everyone should know to improve object retrieval", CVPR '12 Proceedings of the 2012 IEEE Conference on Computer Vision and Pattern Recognition (CVPR), 8 pages.

Spyromitros-Xioufis et al., "A Comprehensive Study over VLAD and Product Quantization in Large-scale Image Retrieval", IEEE Transactions on Multimedia, Oct. 2014, vol. 16, Issue 6, 16 pages.

Arandjelovic et al,, "All about VLAD", IEEE Conference on Computer Vision and Pattern Recognition, 2013, 8 pages.

Jegou et al., "Product quantization for nearest neighbor search", IEEE Transactions on Pattern Analysis and Machine Intelligence, Jan. 2011, vol. 33, Issue 1, 14 pages.

Lowe, "Distinctive Image Features from Scale-Invariant Keypoints", International Journal of Computer Vision, Nov. 2004, vol. 60, Issue 2, 28 pages.

Razavian et al., "Visual Instance Retrieval with Deep Convolutional Network", Computer Science—Computer Vision and Pattern Recognition, Dec. 2014, 8 pages.

\* cited by examiner

120

Generate multiple global signatures

210 — Descriptor Engine obtains a vocabulary including a set of content indices that reference corresponding cells in a descriptor space based on an input set of descriptors

122 — Identify a plurality of local features of an image based on the vocabulary, the local features being represented by a plurality of local descriptors

124 — Determine an associated visual word in the vocabulary for each of the plurality of local descriptors

126 — Select a first pixel location within the image

128 — Generate a first global signature for the image based on the associated visual words, wherein the first global signature is generated using local descriptors corresponding to a first cropped version of the image centered at the first pixel location

130 — Generate one or more additional global signatures for the image based on the associated visual words, wherein the additional global signatures are generated using local descriptors corresponding to different cropped versions of the image centered at the same pixel location as the first cropped version of the image

132 — Select at least one additional pixel location within the image

134 — Generate one or more additional global signatures for the image based on the associated visual words, wherein the additional global signatures are generated using local descriptors corresponding to different cropped versions of the image centered at the at least one additional pixel location

FIG. 1B

LARGE SCALE IMAGE RECOGNITION USING GLOBAL SIGNATURES AND LOCAL FEATURE INFORMATION

CROSS REFERENCE TO RELATED APPLICATIONS

This application claims the benefit of U.S. Provisional Application No. 62/128,976, filed Mar. 5, 2015, the entire content of which is hereby incorporated herein by reference.

TECHNICAL FIELD

This disclosure relates generally to object instance recognition, and more specifically to object instance recognition techniques for digital image recognition searches.

BACKGROUND

Many attempts have been made to improve the scope, accuracy, compactness, efficiency and speed of image recognition and retrieval technologies that may be applied, for example, to implement large-scale digital image recognition searches. One focus of such attempts has been feature detection and description. At the most basic level, descriptors provide a means to characterize, summarize and index distinguishing features of an image (e.g., shapes, objects, etc.) for purposes of image recognition, search and retrieval. There are various methods for generating descriptors that represent the local features of an image. For example, the scale-invariant feature transform (SIFT), such as described in U.S. Pat. No. 6,711,293 to Lowe, is a currently popular image recognition algorithm used to detect and describe local features of images.

A global signature is a full image descriptor. One example of a global signature is a vector of locally aggregated descriptors (VLAD) built from local descriptors. In some instances, a global signature may be compressed or reduced in size (e.g., in relation to a sum of the local descriptors for an image) by further techniques to be a more compact method of describing images relative to large amounts of local descriptors. For example, one current technique for compressing global signatures is principal components analysis (PCA). Notably, the compression of global signatures can reduce the memory requirements necessary to practically operate an image recognition system.

SUMMARY

Local descriptors (e.g., SIFT local descriptors) are a relatively accurate way to characterize, summarize and index distinguishing features of an image. In general, local descriptor accuracy is achieved because each image can be associated with several hundred, or even several thousand, local descriptors. However, a significant problem with using large numbers of local descriptors per image for large-scale image recognition (e.g., an image dataset of 10 million or more images) is the memory and processing power required to store and search local descriptors for a large image dataset. As a result, in many cases large-scale image recognition using only local descriptors is impractical.

Global signatures have been seen as a solution to reduce the memory requirements for large-scale image recognition. However, the advantages of using global signatures are typically offset by concerns about a potential loss in accuracy for image recognition search results. Of particular concern is the inherent loss of information about various local features of an image caused by summarizing and compressing large numbers of local descriptors (e.g., the hundreds or thousands of local descriptors). For example, in some cases global signatures for a group of images can be relatively similar, and practically indistinguishable, if the images include the same types of objects. In other cases, global signatures may obscure critical image recognition factors, such as the presence of multiple objects in images, the scale of objects depicted in images, etc. Therefore, the effectiveness of image recognition using theoretically-efficient global signatures (in terms of processing speed, memory requirements and other factors) is often counterbalanced by the accuracy requirements for implementing a practical and reliable large-scale image recognition system. Until now, the use of global signatures for large-scale image recognition systems has been limited due to these concerns.

Systems, methods and articles of manufacture for large-scale image recognition using global signatures and local feature information are described herein. The various embodiments can allow for a large-scale image recognition system, comprising multiple servers and user devices, to be made more efficient for processing image recognition queries by including global signature information in main memory devices and local feature information in persistent storage devices. In one embodiment, a vocabulary including a set of content indices that reference corresponding cells in a descriptor space based on an input set of descriptors is obtained. A plurality of local features of an image are identified based on the vocabulary, the local features being represented by a plurality of local descriptors. The plurality of local descriptors may be one of scale-invariant feature transform (SIFT) descriptors, Fast Retina Keypoint (FREAK) descriptors, Histograms of Oriented Gradient (HOG) descriptors, Speeded Up Robust Features (SURF) descriptors, DAISY descriptors, Binary Robust Invariant Scalable Keypoints (BRISK) descriptors, FAST descriptors, Binary Robust Independent Elementary Features (BRIEF) descriptors, Harris Corners descriptors, Edges descriptors, Gradient Location and Orientation Histogram (GLOH) descriptors, Electrooculography (EOG) descriptors or Transform Invariant Low-rank Textures (TILT) descriptors, and the image may be a query image. An associated visual word in the vocabulary is determined for each of the plurality of local descriptors. A plurality of global signatures are generated for the image based on the associated visual words, wherein some of the plurality of global signatures are generated using local descriptors corresponding to different cropped versions of the image, two or more of the different cropped versions of the image being centered at a same pixel location of the image, and an image recognition search is facilitated using the plurality of global signatures to search a document image database. The plurality of global signatures may be vector of locally aggregated descriptors (VLAD) global signatures.

In some embodiments, the plurality of global signatures may include at least four global signatures. A one of the plurality of global signatures generated using local descriptors corresponding to a cropped version of the image may be centered at a different pixel location of the image with respect to another one of the plurality of global signatures. In some embodiments, some of the plurality of global signatures may be generated using local descriptors corresponding to an uncropped version of the image.

In one embodiment, one or more global signatures are received for a query image. The global signatures may be received in response to an image recognition query, wherein some of the global signatures are generated using local descriptors corresponding to different cropped versions of the query image. A ranking order is determined for a plurality of document images based on nearest neighbor relations between document signatures corresponding to the plurality of document images and each one of the global signatures for the query image. The one or more global signatures for the query image and the document signatures for the document images may be VLAD global signatures. A subset of the plurality of document images is selected based on the determined ranking order. Additional document data corresponding to the selected subset of the plurality of document images is obtained, and a search result is generated based on a geometric verification between the additional document data and the query image. The search result of the image recognition query may be sent to a client/user device. The nearest neighbor relations may be based on Euclidean distance and the ranking order may be determined based on a k-dimensional (k-d) tree ranking technique.

In some embodiments, the geometric verification may be based on a product quantization technique. The product quantization technique may include an asymmetric distance computation. In some embodiments, the geometric verification may be based on a similarity geometry check, a homographic technique, an essential matrix technique, and/or at least one of metadata information, global positioning system information, a Hough transform test, and a Hamming embedding distance. In some embodiments, the geometric verification may include a plurality of filtering stages.

In some embodiments, the additional document data for each one of the selected subset of the plurality of document images may include, for each document image, one or more of an image ID, a data type indicator and a global image signature. In some embodiments, the image ID may be no more than 8 bytes, the global image signature may be no more than 64 bytes, and the data type indicator may be no more than 1 byte.

In some embodiments, the additional document data for each one of the selected subset of the plurality of document images may include, for each local feature of a document image, one or more a cluster index, a product quantization (PQ) index, an indication of at least one of a location, orientation and scale, and an indication of at least one of a 3D location and a surface normal of the 3D location. In some embodiments, the cluster index may be no more than 4 bytes, the PQ index may be no more than 4 bytes, the indication of at least one of a location, orientation and scale may be no more than 16 bytes, and the indication of at least one of a 3D location and a surface normal of the 3D location may be no more than 4 bytes.

In some embodiments, the selected subset of the plurality of document images may include at least one of a proportion of document images in relation to the plurality of document images and a minimum number of document images. In some embodiments, the selected subset of the plurality of document images may be equal to or between 300 and 500 document images.

Various objects, features, aspects and advantages of the inventive subject matter will become more apparent from the following specification, along with the accompanying drawings in which like numerals represent like components.

BRIEF DESCRIPTION OF THE DRAWINGS

FIG. 1B illustrates a flow diagram of example operations for generating a plurality of global signatures for an image in accordance with an embodiment.

Figure 1A:
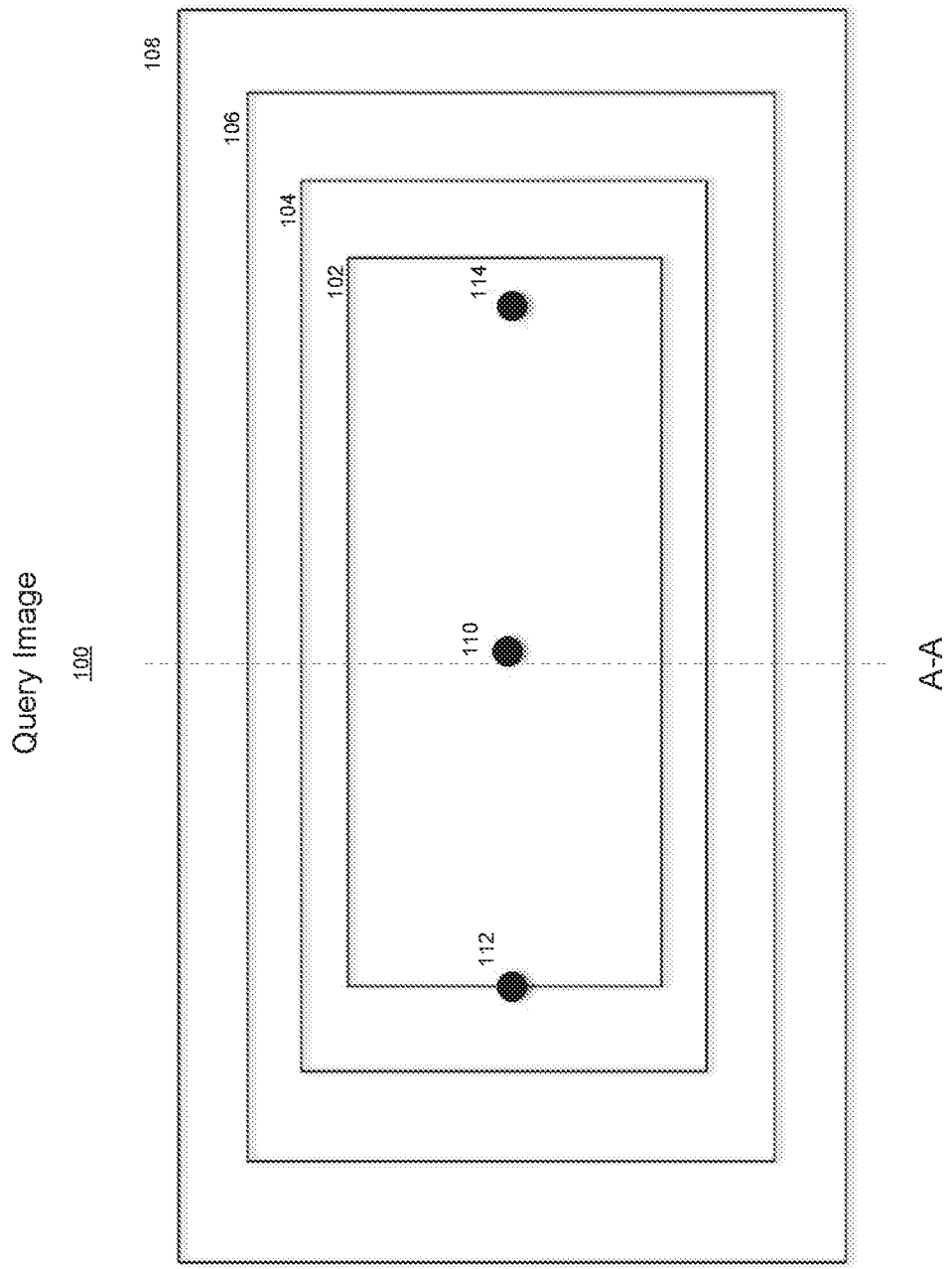
FIG. 1A illustrates an example of different cropped versions of an image in accordance with an embodiment.

While the invention is described with reference to the above drawings, the drawings are intended to be illustrative, and other embodiments are consistent with the spirit, and within the scope, of the invention.

SPECIFICATION

The various embodiments now will be described more fully hereinafter with reference to the accompanying drawings, which form a part hereof, and which show, by way of illustration, specific examples of practicing the embodiments. This specification may, however, be embodied in many different forms and should not be construed as limited to the embodiments set forth herein; rather, these embodiments are provided so that this specification will be thorough and complete, and will fully convey the scope of the invention to those skilled in the art. Among other things, this specification may be embodied as methods or devices. Accordingly, any of the various embodiments herein may take the form of an entirely hardware embodiment, an entirely software embodiment or an embodiment combining software and hardware aspects. The following specification is, therefore, not to be taken in a limiting sense.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator, and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to"

and "coupled with" are also used to mean "communicatively coupled with", possibly via one or more intermediary devices.

In addition, throughout the specification, the meaning of "a," "an," and "the" includes plural references, and the meaning of "in" includes "in" and "on."

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

The focus of the disclosed inventive subject matter is to enable construction or configuration of a computing device to operate on vast quantities of digital data, beyond the capabilities of a human. Although, in some embodiments, the digital data represents images, it should be appreciated that the digital data is a representation of one or more digital models of images, not necessarily the images themselves. By instantiation of such digital models in the memory of the computing devices, the computing devices are able to manage the digital data or models in a manner that could provide utility to a user of the computing device that the user would lack without such a tool.

One should appreciate that the disclosed techniques provide many advantageous technical effects including improving the scope, accuracy, compactness, efficiency and speed of computer-based image recognition and retrieval technologies. It should also be appreciated that the following specification is not intended as an extensive overview, and as such, concepts may be simplified in the interests of clarity and brevity.

In accordance with the various embodiments, object instance retrieval, referred to herein in the context of image retrieval and/or image recognition, involves systems and methods of feature detection for an image dataset (referred to herein individually as "images" or "document images") in response to a given query image. Image recognition is made possible through the use of descriptors that characterize, summarize and index distinguishing features of an image. Large-scale image recognition can involve multiple servers running in parallel and image datasets of 10 million or more images per server (relative to image datasets of about 1 million images per server for medium-scale image recognition). However, due to the storage requirements for the descriptors that correspond to large image datasets, there is often a tradeoff between the memory footprint of an image descriptor and image retrieval performance as measured by, for example, mean average precision (mAP). Therefore, compact image descriptors are preferable to perform image recognition on a large scale.

Local descriptors are vectors that correspond to one or more distinguishable local features of an image (e.g., shapes, objects, etc.). There are various methods for detecting image features and generating local descriptors. For example, the scale-invariant feature transform (SIFT) is a currently popular image recognition algorithm used to detect and describe local features of images. SIFT descriptors are 128-dimensions in order to be highly distinctive (i.e., distinguishable for matching purposes) and at least partially tolerant to variations such as illumination, three-dimensional (3D) viewpoint, etc. For example, one reference related to generating SIFT descriptors is D. Lowe, "Distinctive Image Features from Scale-Invariant Keypoints", International Journal of Computer Vision 60 (2), pages 91-110 (2004). In addition to SIFT descriptors, other alternative local descriptors include Fast Retina Keypoint (FREAK) descriptors, Histograms of Oriented Gradient (HOG) descriptors, Speeded Up Robust Features (SURF) descriptors, DAISY descriptors, Binary Robust Invariant Scalable Keypoints (BRISK) descriptors, FAST descriptors, Binary Robust Independent Elementary Features (BRIEF) descriptors, Harris Corners descriptors, Edges descriptors, Gradient Location and Orientation Histogram (GLOH) descriptors, Electrooculography (EOG) descriptors and Transform Invariant Low-rank Textures (TILT) descriptors. Typically, each image of an image dataset may include hundreds or thousands of local features represented by local descriptors. Therefore, practical system constraints will often require means to both compress the amount of descriptors used to describe an image dataset, and to reduce in size the memory required to store the information contained in local descriptors.

A global signature is a full image descriptor that can represent an entire image or a cropped version of an image, rather than merely an object that an image contains. For example, Vector of Locally Aggregated Descriptors (VLAD) global signatures are one type of global signature used in the embodiments herein to represent entire images. In addition to VLAD signatures, other types of global image signatures include, for example, GIST signatures and Deep Learning signatures.

VLAD global signatures are compact, fixed-length vectors built from local descriptors. Ideally, if two images contain the same object, a distance measurement (e.g., a Hamming distance) between VLAD signatures representing the two images should be relatively small compared to a distance measurement between VLAD signatures representing images that do not contain the same object. In general, VLAD signatures (also referred to herein as "VLAD global signatures") are considered to be low dimensional, in terms of bytes per image. As a result, it has been shown that VLAD signatures corresponding to large image datasets can be made to fit into a main memory device (e.g., a client device main memory or a server main memory). It should be noted that the term "signature" is used throughout this specification to describe descriptors that are "global" in nature, including VLAD signatures that correspond to an entire image or cropped versions of an image. Although the terms global signature and global descriptor should be considered to be interchangeable, the term global signature is used herein to distinguish such global feature descriptors from local descriptors, which correspond to local features.

A VLAD global signature may be constructed by extracting local features from an image that are described using local descriptors, such as 128-dimensional SIFT local descriptors. The image is then divided into k cluster centers (e.g., k may equal 64, 256 or another number), and each local descriptor of the image is assigned to a closest one of the k cluster centers. Then for each of the k cluster centers, the local descriptors are vector quantized by recording the residuals (differences) between each of the local descriptor vectors and the cluster centers to which they are assigned. The sums of the k residuals for each of the cluster centers are concatenated into a single (k*128 dimensional) VLAD signature. Typically, the VLAD signature is then compressed to reduce the number of dimensions by using, for example, a Principal Components Analysis (PCA) projection matrix. For example, applying a PCA projection matrix may reduce the number of dimensions of the VLAD signature by a factor of 100 or more (e.g., from k*128 dimensions to 64 dimensions).

Multiple spatial global signatures (including the "Multiple VLAD signatures" referred to herein) may be determined for an image. For example, VLAD signatures that are focused around different cropped versions of an image can enable a recognition search for objects that are not centered in an image or only extend over a relatively small portion of an image (e.g., objects that cover less than a majority of a model/query image or objects that happen to be off-center in a typically centered model/query image), without having to revert to the use of local descriptors. Multiple VLAD signatures have been shown to improve image retrieval performance for small objects (i.e., objects that cover a relatively small portion of an image). One skilled in the art will appreciate that various techniques are possible for generating and compressing multiple VLAD signatures, including techniques in the areas of vocabulary adaptation and intra-normalization. For example, one reference related to generating and compressing multiple VLAD signatures is R. Arandjelovic and A. Zisserman, "All about VLAD", CVPR'13 Proceedings of the 2013 IEEE Conference on Computer Vision and Pattern Recognition, pages 1578-1585 (2013). Moreover, as mentioned above, other methods for generating global signatures are possible (e.g., methods for generating Deep Learning signatures) and one skilled in the art will further appreciate that the multiple global signatures described herein may be generated based on those methods. For example, one reference related to generating global signatures without using local descriptors is A. Razavian, J. Sullivan, A. Maki and S. Carlsson, "Visual Instance Retrieval with Deep Convolutional Network", arXiv preprint arXiv:1412.6574 (2014). Therefore, the examples for generating and compressing global signatures disclosed herein, while exemplary, should not be construed as being limited to the means explicitly disclosed.

FIG. 1A illustrates an example of different cropped versions of an image in accordance with an embodiment. In FIG. 1A, a plurality of cropped versions of image 100 are shown, and a plurality of VLAD global signatures may extracted that correspond to the different cropped versions of the image. For example, pixel location 110 may be the basis for a VLAD signature corresponding to all of image 100, denoted by box 108, as well as VLAD signatures corresponding to different cropped versions of image 100, such as cropped versions of image 100 denoted by boxes 102, 104 and 106. For example, generating a VLAD signature for a cropping of image 100 around pixel location 110 can include extracting local features represented by a plurality of local descriptors, such as 128-dimensional SIFT local descriptors, from within box 104. Box 104 is then divided into k cluster centers (e.g., k may equal 64 or 256), and each local descriptor within box 104 is assigned to a closest one of the k cluster centers. Then for each of the k cluster centers, the local descriptors are vector quantized by recording the residuals between each of the local descriptor vectors and the cluster centers to which they are assigned. The sums of the k residuals (or visual words) for each of the cluster centers are concatenated into a single (k*128 dimensional) VLAD signature for the image within box 104, which may then be compressed by using, for example, PCA (e.g., from k*128 dimensional to 64 dimensions).

Although image 100 may be a model/query image intended to be centered around a desired object of interest (e.g., the desired object of interest may be related to an object for sale on an e-commerce website), in certain instances, the desired object of interest may be located at an off-center location within image 100. As such, in another example, pixel location 112 may be used as a center point for a VLAD signature that corresponds to a cropped version of image 100 that includes the portion of the image to the left of linear segment A-A. Therefore, generating a VLAD signature would include extracting local features represented by a plurality of local descriptors, such as 128-dimensional SIFT local descriptors, only to the left of linear segment A-A. Likewise, a VLAD signature centered at pixel location 114 would correspond to a cropped version of image 100 that includes the portion of the image to the right of linear segment A-A, and generating the VLAD signature would include extracting local features represented by the plurality of local descriptors only to the right of linear segment A-A. While the cropped versions of image 100 shown in FIG. 1A would yield a total of 12 VLAD signatures (i.e., VLAD signatures for four different cropped versions of the image 102, 104, 106, 108 centered around three pixel locations 110, 112, 114), more or fewer VLAD signatures may be extracted from an image. In various embodiments, the global descriptor-based image recognition systems and methods described below contemplate using a single global (e.g., VLAD) signature to describe document images of an image dataset, and at least four global (e.g., VLAD) signatures to describe a query image. While a desirable number of global signatures for both document images and query images may depend on any combination of memory footprint constraints and recognition performance considerations, in general, only the query image will require multiple VLAD signatures (e.g., to capture objects of interest located at an off-center image location) because objects of interest will typically be centered in the document images of an image dataset.

FIG. 1B illustrates a flow diagram of example operations for generating a plurality of global signatures for an image in accordance with an embodiment. In diagram 120, a descriptor engine (such as descriptor engine 210 shown in FIG. 2) obtains a vocabulary including a set of content indices that reference corresponding cells in a descriptor space based on an input set of descriptors. At step 122, a plurality of local features represented by a plurality of local descriptors are identified for an image, e.g., image 100, based on the vocabulary. In some embodiments, the plurality of local descriptors may be SIFT descriptors. In other embodiments, the plurality of local descriptors may be one of FREAK descriptors, HOG descriptors, SURF descriptors, DAISY descriptors, BRISK descriptors, FAST descriptors, BRIEF descriptors, Harris Corners descriptors, Edges descriptors, GLOH descriptors, EOG descriptors or TILT descriptors. At step 124, an associated visual word in the vocabulary is determined for each of the plurality of local descriptors. For example, a dictionary may be used to associate local descriptors with visual words. The dictionary may be a VLAD dictionary in which a plurality of visual words are based on descriptors determined from a training sample of model images.

At step 126, a signature engine (such as signature engine 230 shown in FIG. 2) selects a first pixel location within the image for generating a global signature. For example, the first pixel location may be a pixel location that corresponds to a center point of an image, such as pixel location 110 of image 100. At step 128, a first global signature (e.g., a VLAD signature) is generated for the image based on the associated visual words, wherein the first global signature is generated using local descriptors corresponding to a first cropped version of the image centered at the first pixel location within the image, e.g., cropped version 102 of image 100 shown in FIG. 1A. At step 130, one or more additional global signatures are generated for the image based on the associated visual words. In an embodiment, the additional global signatures are generated using local descriptors corresponding to different cropped versions of the image centered at the same pixel location as the first cropped version of the image. For example, the additional global signatures may be VLAD signatures for the cropped versions 104, 106 and 108 of image 100, as shown in FIG. 1A.

At step 132, at least one additional pixel location within image 100 is selected for generating a global signature. For example, the at least one additional pixel location may include pixel locations 112 and 114 of image 100. At step 134, one or more additional global signatures are generated for the image based on the associated visual words, wherein the additional global signatures are generated using local descriptors corresponding to different cropped versions of the image centered at the at least one additional pixel location. For example, pixel location 112 may be used as a center point for a VLAD signature that corresponds to a cropped version of image 100 that includes the portion of the image to the left of linear segment A-A. Therefore, generating a VLAD signature would include extracting local features represented by a plurality of local descriptors, such as 128-dimensional SIFT local descriptors, only to the left of linear segment A-A. Likewise, a VLAD signature centered at pixel location 114 would correspond to a cropped version of image 100 that includes the portion of the image to the right of linear segment A-A, and generating the VLAD signature would include extracting local features represented by the plurality of local descriptors only to the right of linear segment A-A.

The plurality of global signatures will preferably include at least four global signatures, but more or fewer global signatures may be generated. Further, in some embodiments one of the plurality of global signatures may be generated using local descriptors corresponding to an uncropped version of the image. As a result of generating a plurality of global signatures for an image, such as image 100 (e.g., a model/query image), an image recognition search may be facilitated using the plurality of global signatures to search a document image database.

Large-Scale Image Recognition

The image recognition systems and methods herein address various memory footprint and precision challenges associated with large-scale image recognition. As described above, large-scale image recognition may include generating a plurality of global signatures for a query image. For example, generating a global signature can include extracting local descriptors corresponding to local features from a query image. The local descriptors for each feature may then be associated with visual words of a global signature vocabulary (e.g., a VLAD signature vocabulary), and one or more global signatures may be generated for the query image based on the associated visual words. In some embodiments, some of the one or more global signatures are generated using local descriptors corresponding to different cropped versions of the image. Multiple global signatures (e.g., VLAD global signatures) may be generated for query images to improve image recognition accuracy with respect to objects that may be off-center, or that cover relatively small areas (e.g., less than a majority) of query images or document images.

In one embodiment, large-scale image recognition includes comparing the one or more query image global signatures stored in a main memory device with a plurality of document image global signatures. The image recognition search includes document image ranking. For example, for each query image global signature, a nearest neighbor ranking of document images may be found by comparing the query image global signature to global signatures of document images, using, for example, a document signature k-d tree and searching algorithm. Additional document information for the top N nearest neighbor document images may then be loaded from a persistent storage device into the main memory device.

In an embodiment, large-scale image recognition further includes geometric verification. For example, geometric verification may be performed after or during (i.e., in parallel with) the loading of additional document information for the top N nearest neighbor document images from the persistent storage device into the main memory device. In some embodiments, for each ranked document image, geometric verification includes a product quantization distance check. The product quantization distance check may be used to determine a correspondence between a document image and a feature descriptor from the query image. In some embodiments, document images that satisfy a distance check threshold may filtered in one or more stages to remove false positives and/or to further refine the document image ranking.

It should be noted that the image recognition systems and methods described herein contemplate large-scale image recognition. For example, a large-scale image recognition system may include one or more document servers, e.g., cloud-based servers, which may offer their services via web-based APIs. In some embodiments, the techniques for generating global signatures may allow one or more of the document servers to contain global signatures corresponding to more than 10 million document images and corresponding document information. For example, a typical server may contain global signatures corresponding to 40 million document images. Moreover, the document servers contemplated by some embodiments may be capable of a search response time that allows for image recognition based on multiple query image global signatures at 5 to 10 frames (images) per second.

Figure 2:
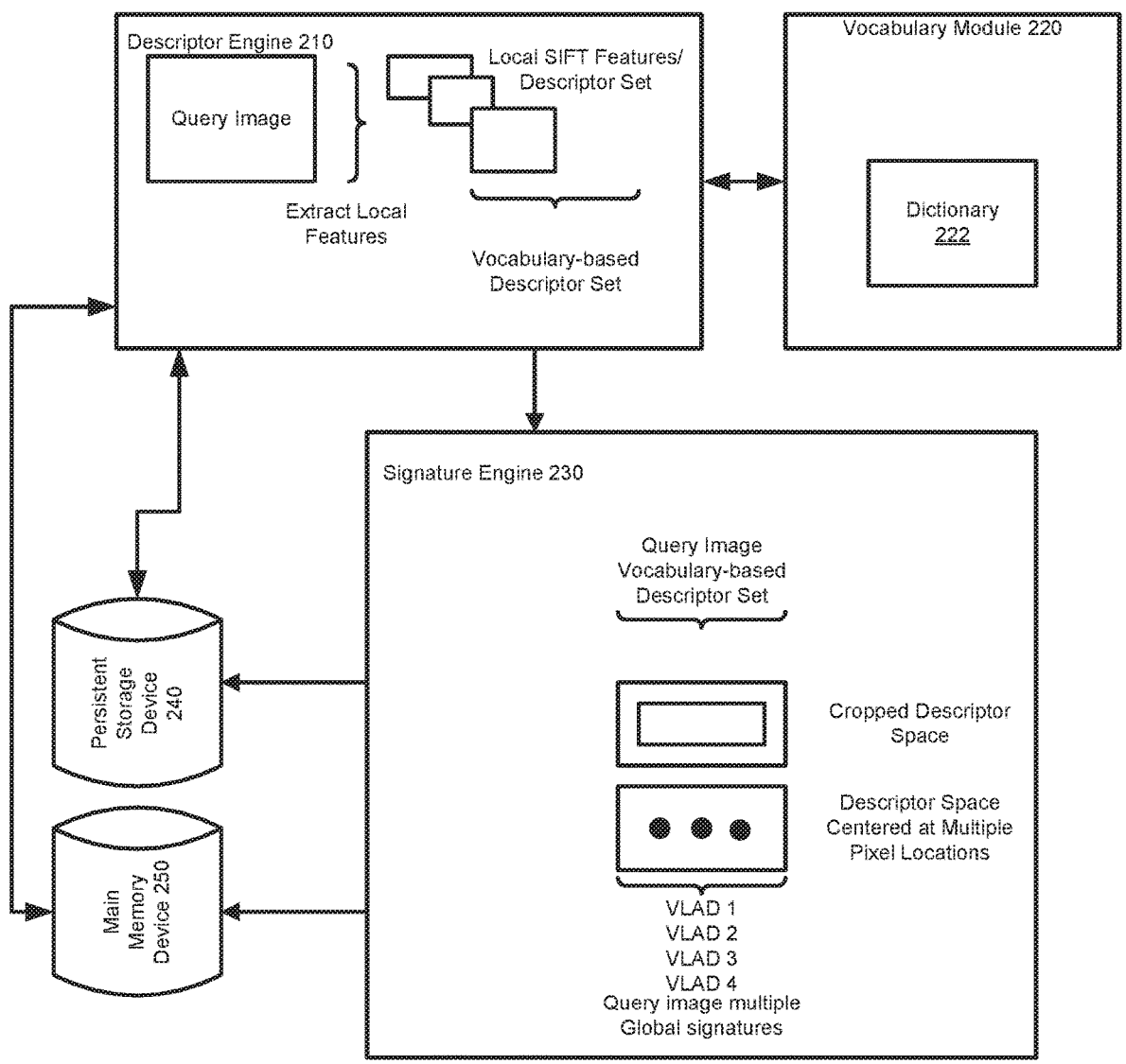
FIG. 2 illustrates a block diagram of a system for generating a plurality of global signatures for an image in accordance with an embodiment.

FIG. 2 illustrates a block diagram of a system for generating a plurality of global signatures for an image in accordance with an embodiment. In block diagram 200, elements for generating global signatures for a query image include a descriptor engine 210, a vocabulary module 220, a signature engine 230, a persistent storage device 240 and a main memory device 250. However, it should be noted that the elements in FIG. 2, and the various functions attributed to each of the elements, while exemplary, are described as such solely for the purposes of ease of understanding. One skilled in the art will appreciate that one or more of the functions ascribed to the various elements may be performed by any one of the other elements, and/or by an element (not shown) configured to perform a combination of the various functions. Therefore, it should be noted that any language directed to descriptor engine 210, a vocabulary module 220, a signature engine 230, a persistent storage device 240 and a main memory device 250 should be read to include any suitable combination of computing devices, including servers, interfaces, systems, databases, agents, peers, engines, controllers, modules, or other types of computing devices operating individually or collectively to perform the functions ascribed to the various elements. Further, one skilled in the art will appreciate that one or more of the functions of the system of FIG. 2 described herein may be performed within the context of a client-server relationship, such as by one or more servers, one or more client devices (e.g., one or more user devices) and/or by a combination of one or more servers and client devices.

In some embodiments, descriptor engine 210 identifies a plurality of local features of an image based on a vocabulary. For example, descriptor engine 210 may extract a plurality of local features from a query image and associate the local features with corresponding local descriptors designed to represent local features. In some embodiments, descriptor engine 210 may be configured to associate local features of the query image with SIFT local descriptors. Alternatively, descriptor engine 210 may be configured to associate local features of the query image with FREAK descriptors, HOG descriptors, SURF descriptors, DAISY descriptors, BRISK descriptors, FAST descriptors, BRIEF descriptors, Harris Corners descriptors, Edges descriptors, GLOH descriptors, EOG descriptors or TILT descriptors.

In an embodiment, descriptor engine 210 is configured to generate a global vocabulary-based descriptor set for the query image. For example, descriptor engine 210 may be coupled to vocabulary module 220 to obtain an associated visual word in a global vocabulary for each of the plurality of local descriptors in the query image. Vocabulary module 220 includes a dictionary 222 that may be used to associate local descriptors with visual words. For example, dictionary 222 may be a VLAD dictionary in which a plurality of visual words are based on descriptors determined from a training sample of model images. Exemplary systems and methods for generating a global vocabulary, such as for a global vocabulary-based descriptor set, are described in U.S. patent application Ser. No. 14/622,621, entitled "Global Visual Vocabulary, Systems and Methods", filed on Feb. 13, 2015, which is incorporated in its entirety by reference herein.

In an embodiment, signature engine 230 is coupled to descriptor engine 210 and configured to obtain the vocabulary-based descriptor set for the query image (i.e., the associated visual words for each of the plurality of local descriptors). Signature engine 230 is then configured to use the descriptor set to generate a plurality global signatures for the query image based on the associated visual words. The plurality of global signatures may be VLAD global signatures. As described in FIG. 1A, some of the plurality of global signatures may be generated using local descriptors corresponding to different cropped versions of the query image (e.g., multiple global signatures centered at a center point and at one or more different off-center pixel locations). The cropped versions of the query image may be determined, for example, in order to focus a VLAD signature around one or more features or objects in the query image. While a typical query image may be centered around an object of interest, oftentimes distinguishing features are located off-center in an image, or only cover a small portion of an image. Therefore, in order to improve image recognition performance with regard to such features or objects, multiple VLAD signatures may be generated to account for off-center features or objects.

In some embodiments, signature engine 230 is further configured to facilitate an image recognition search comparing the plurality of global signatures with a plurality of document images. For example, query image VLAD signatures stored in main memory device 250 may be used to conduct a large-scale image recognition search between the query image and a plurality of document images, such as may be stored in main memory device 250 and/or persistent storage device 240. Moreover, in some embodiments signature engine 230 may obtain one or more vocabulary-based descriptor sets for a document image dataset and may generate global signatures (e.g., VLAD signatures) for one or more document images. As such, signature engine 230 may facilitate an image recognition search by generating global signatures for an image dataset of document images as well as for a query image. Signature engine 230 may then store global signatures for the document image dataset in main memory device 250 and/or persistent storage device 240 to facilitate an image recognition search.

Figure 3:
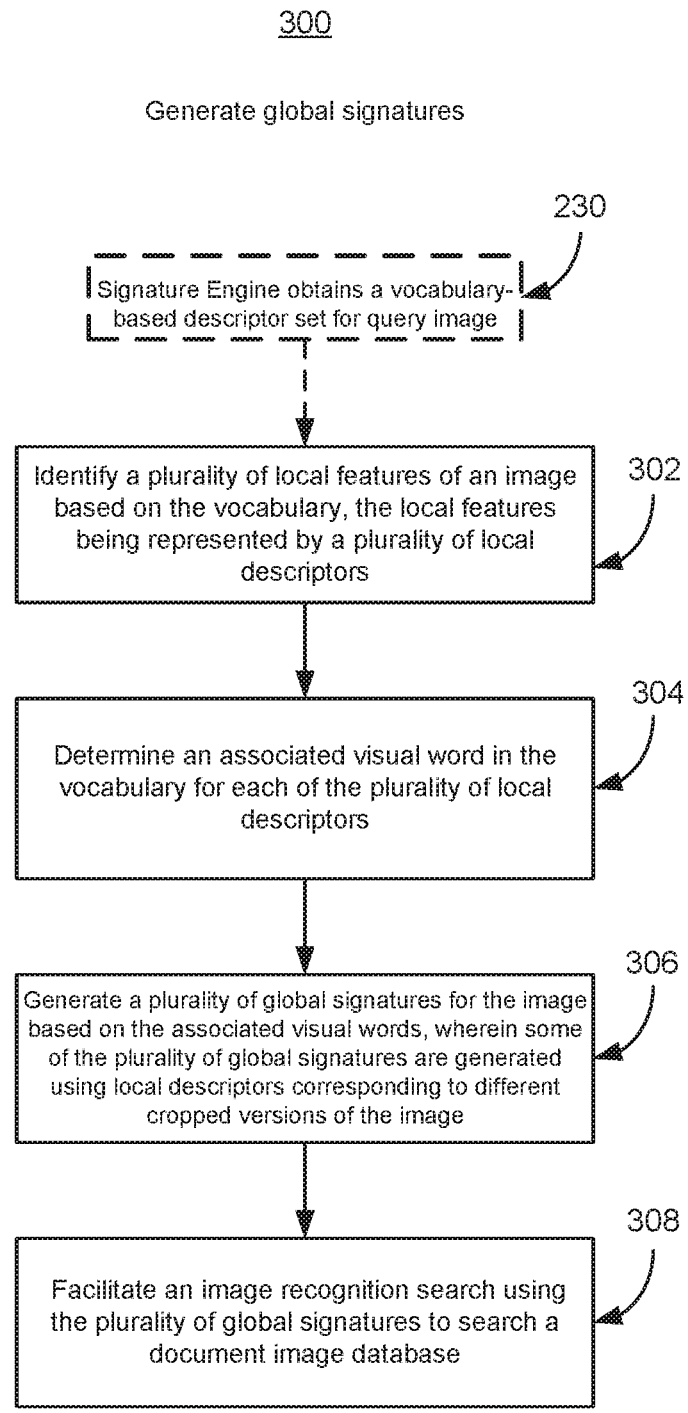
FIG. 3 illustrates a flow diagram of example operations for generating a plurality of global signatures for an image in accordance with an embodiment.

FIG. 3 illustrates a flow diagram of example operations for generating a plurality of global signatures for an image in accordance with an embodiment. In diagram 300, signature engine 230 obtains the vocabulary-based descriptor set for the query image (i.e., the associated visual words for each of the plurality of local descriptors). At step 302, a plurality of local features represented by a plurality of local descriptors are identified for an image, e.g., a query image, based on the vocabulary. In some embodiments, the plurality of local descriptors may be SIFT descriptors. In other embodiments, the plurality of local descriptors may be one of FREAK descriptors, HOG descriptors, SURF descriptors, DAISY descriptors, BRISK descriptors, FAST descriptors, BRIEF descriptors, Harris Corners descriptors, Edges descriptors, GLOH descriptors, EOG descriptors or TILT descriptors. At step 304, an associated visual word in the vocabulary is determined for each of the plurality of local descriptors. For example, a dictionary, such as dictionary 222, may be used to associate local descriptors with visual words. The dictionary may be a VLAD dictionary in which a plurality of visual words are based on descriptors determined from a training sample of model images.

At step 306, a plurality of global signatures (e.g., VLAD signatures) are generated for the image based on the associated visual words, wherein some of the plurality of global signatures are generated using local descriptors corresponding to different cropped versions of the image such as, e.g., the cropped versions of an image shown in FIG. 1A. In some embodiments, a one of the plurality of global signatures generated using local descriptors corresponding to a cropped version of the image may be centered at a different pixel location of the image (e.g., at one of pixel locations 112 or 114 of FIG. 1A) with respect to another one of the plurality of global signatures. In some embodiments, one of the plurality of global signatures may be generated using local descriptors corresponding to an uncropped version of the image. The plurality of global signatures will preferably include at least four global signatures, but more or fewer global signatures may be generated. At step 308, signature engine 230 may facilitate an image recognition search using the plurality of global signatures to search a document image database.

Figure 4:
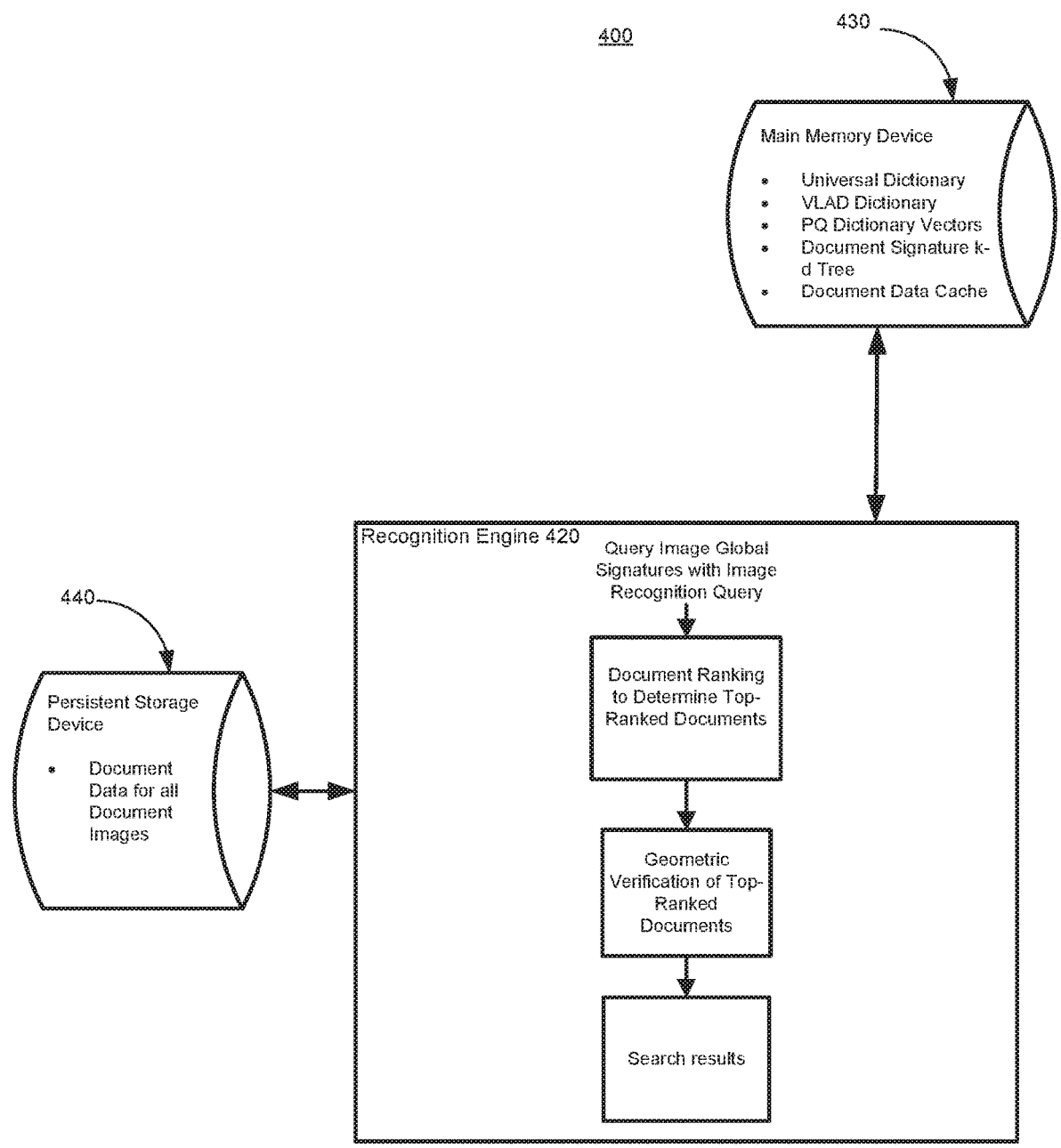
FIG. 4 illustrates a block diagram of a system for large-scale image recognition in accordance with an embodiment.

FIG. 4 illustrates a block diagram of a system for large-scale image recognition in accordance with an embodiment. In block diagram 400, elements for large-scale image recognition using global signatures and local feature information recognition engine 420, main memory device 430 and persistent storage device 440. It should be noted that the elements in FIG. 4, and the various functions attributed to each of the elements in the following discussion, while exemplary, are described as such solely for the purposes of ease of understanding. One skilled in the art will appreciate that one or more of the functions ascribed to the various elements may be performed by any one of the other elements, and/or by an element (not shown) configured to perform any combination of the various functions. Therefore, it should be noted that any language directed to recognition engine 420, main memory device 430 and persistent storage device 440 should be read to include any suitable combination of computing devices, including servers, interfaces, systems, databases, agents, peers, engines, controllers, modules, or other types of computing devices operating individually or collectively to perform the functions ascribed to the various elements. Further, one skilled in the art will appreciate that one or more of the functions described herein may be performed within the context of a client-server relationship, such as by one or more servers, one or more client devices (e.g., one or more user devices) and/or by a combination of one or more servers and client devices.

As described above with respect to FIG. 2, signature engine 230 is configured to obtain a vocabulary-based descriptor set for a query image, and use the descriptor set to generate one or more global signatures for the query image. For example, some of the global signatures may be generated using local descriptors corresponding to different cropped versions of the query image. As such, in some embodiments one or more of the query image global signatures may focus around one or more features or objects in the query image, and improve image recognition performance with regard to such features or objects.

As shown in FIG. 4, recognition engine 420 is configured to determine a ranking order for a plurality of document images based on nearest neighbor relations between document signatures corresponding to the plurality of document images and each one of the query image global signatures, such as in response to an image recognition query. It should be appreciated that one or more of a determining device configured to determine such a ranking order, a selecting device configured to select a subset of the plurality of document images based on the determined ranking order and a generating device configured to generate a search result may collectively comprise recognition engine 420. Further, it should be noted that any language herein directed to a determining device, selecting device and generating device may be referring to discrete components of recognition engine 420, or may include any suitable combination of computing devices, including servers, interfaces, systems, databases, agents, peers, engines, controllers, modules, or other types of computing devices operating individually or collectively to perform functions ascribed to one or more determining devices, generating devices and selecting devices of recognition engine 420.

In an embodiment, recognition engine 420 receives the query image global signatures with an image recognition query, and is coupled to main memory device 430 to obtain the document signatures corresponding to the plurality of document images (and other data for determining the ranking order). Further, recognition engine 420 may access main memory device 430 to obtain one or more of a universal dictionary, a VLAD dictionary, product quantization dictionary vectors, a document signature k-d tree and a document data cache. For example, recognition engine 420 may access the VLAD dictionary (e.g., 512 words) to associate local descriptors with global visual words, while the universal dictionary (e.g., including a local feature vocabulary of between ¼ million to 2 million words) may be accessed for more computationally efficient methods of verification of selected document images using local features. For example, when a relatively small (e.g., a ¼ million word) local feature vocabulary of the universal dictionary is used, local feature correspondences can be efficiently determined because both the document image features and the query image features share the same relatively limited vocabulary index. The document signature k-d tree from main memory device 430 may be employed to determine a nearest neighbor ranking order for the plurality of document image global signatures. For example, recognition engine 420 may be configured to obtain the document signature k-d tree from the main memory device to determine the ranking order for the plurality of document images, such as by using a k-d tree ranking algorithm. In some embodiments, recognition engine 420 may comprise a determining device configured to determine a ranking order for the plurality of document images based on nearest neighbor relations between document signatures corresponding to the plurality of document images and each one of the one or more global signatures for the query image.

Recognition engine 420 is configured to select a subset of the plurality of document images based on the determined ranking order. For example, recognition engine 420 may be configured to select a fixed number of document images (e.g., the top 300-500 nearest neighbor document images). Alternatively, recognition engine 420 may be configured to select at least one of a proportion (i.e., ratio) of document images (e.g., as determined by a proportion of the total number of document images in the document image dataset) and a minimum number of document images (e.g., at least 300 document images). In some embodiments, recognition engine 420 may comprise a selecting device configured to select the subset of the plurality of document images based on the determined ranking order.

Recognition engine 420 is then configured to obtain additional document data corresponding to the selected subset of the plurality of document images, e.g., from persistent storage device 440, and generate a search result based on a geometric verification between the additional document data and the query image. For example, recognition engine 420 may be configured to access the product quantization dictionary (e.g., 2*8 million words) from main memory device 430 to generate the search result based on the geometric verification. In some embodiments, the document data cache of main memory device 430 may store certain document information, e.g., a subset of the document information typically stored in a persistent storage device, for relatively rapid access. For example, recognition engine 420 may be configured to obtain the additional document data for the selected subset of the plurality of document images from the document data cache. In some embodiments, recognition engine 420 may comprise a generating device configured to generate the search result based on the geometric verification between the additional document data corresponding to the selected subset of the plurality of document images and the query image.

Figure 5:
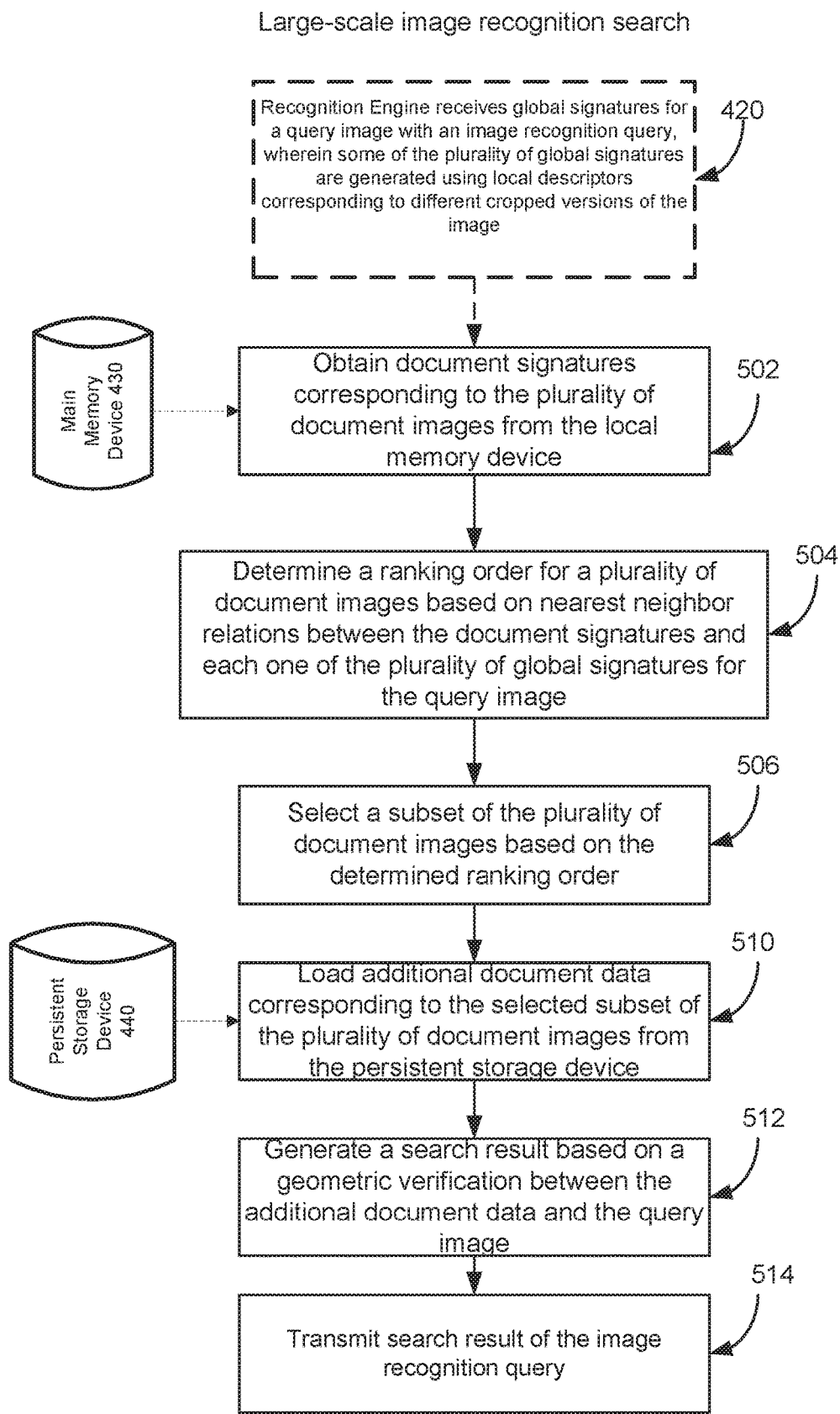
FIG. 5 illustrates a flow diagram of example operations of one or more aspects of a large-scale image recognition system or method in accordance with an embodiment.

FIG. 5 illustrates a flow diagram of example operations of one or more aspects of a large-scale image recognition system or method in accordance with an embodiment. In diagram 500, recognition engine 420 receives global signatures (e.g., VLAD global signatures) for a query image with an image recognition query, wherein some of the one or more global signatures are generated using local descriptors, e.g., SIFT descriptors, corresponding to different cropped versions of the query image. In some embodiments, receiving the one or more global signatures for the query image may include obtaining associated visual words for each of a plurality of local descriptors for the query image, and generating the one or more global signatures for the query image based on the associated visual words. At step 502, recognition engine 420 obtains document signatures corresponding to a plurality of document images from, e.g., main memory device 430. In some embodiments, the document signatures may be VLAD global signatures.

A ranking order is determined for the plurality of document images based on nearest neighbor relations between document signatures corresponding to the plurality of document images and each one of the one or more global signatures for the query image at step 504. The nearest neighbor relations, based on Euclidean distance, may be determined based on, for example, a k-d tree, spill tree or other ranking technique. For example, a nearest neighbor search based on a k-d tree aims to find the point in the tree that is nearest to a given input point (e.g., a given one of the query image global signatures). The structural properties of the k-d tree are used to quickly eliminate large portions of the search space. For example, searching for a nearest neighbor in a k-d tree may include: starting with a root node, recursively traversing a tree of data points (e.g., document image signatures) as if the search point were being inserted at each node (i.e., the traversal proceeds either left or right depending on whether the search point is lesser than or greater than the current node in the split dimension). Once the traversal reaches a leaf node, it saves that node point as the current best node (i.e., the current nearest neighbor). The recursion of the tree is then unwound by determining, at each node, if the current node is closer than the current best (at which point the current node becomes the current nearest neighbor) and if there could be any points on the other side of a splitting plane that are closer to the search point than the current nearest neighbor. This process continues until the process for the root node is completed, at which point the search is complete and each node has been ranked relative to the other nodes.

A subset of the plurality of document images is selected based on the determined ranking order at step 506. For example, recognition engine 420 may be configured to select a minimum or fixed number of document images (e.g., the top 300-500 nearest neighbor document images) based at least in part on one or more memory footprint considerations or document retrieval time considerations. Alternatively, recognition engine 420 may be configured to select a proportion of document images, such as may be determined based at least in part on, for example, one or more of the total number of document images in the document image dataset, memory footprint considerations or document retrieval time considerations.

At step 510, additional document data corresponding to the selected subset of the plurality of document images is loaded from persistent storage device 440. In some embodiments, the additional document data for each one of the selected subset of the plurality of document images may include certain information for each document image as a whole and for each local feature of a document image. For example, the additional document data may include, for each document image, one or more of an image ID, a data type indicator and a global image signature that may be selected to account for various memory footprint and document retrieval considerations. For example, an image ID that is unique to each document image may be 8 bytes or less. The global image signature (e.g., a compressed VLAD signature for a document image) may be 64 bytes or less, and the data type indicator may be no more than 1 byte for each document image. In some embodiments, the additional document data may also include, for each local feature of a document image, one or more of a cluster index, a PQ index, an indication of at least one of a location, orientation and scale, and an indication of at least one of a 3D location and/or a surface normal of the 3D location. For example, the cluster index may be 4 bytes or less. The PQ index of all features in a document image may be 4 bytes or less. The indication of at least one of a location (e.g., a 2D pixel or 3D location), orientation (an index of the orientation) and scale for each feature may be 16 bytes or less, and the indication of at least one of a 3D location and/or a surface normal of the 3D location may be 4 bytes or less. As such, the additional document data corresponding to each document image may be 10 KB or less, e.g., depending on whether further compression is employed on the data set as a whole.

At step 512, an image recognition search result is generated based on a geometric verification between the additional document data corresponding to the selected subset of the plurality of document images and the query image. In some embodiments, the geometric verification may be based on a product quantization technique. Product quantization is a compression technique used to generate a compressed representation of a local descriptor. In general, product quantization provides for a finer grained representation space than is possible using local descriptor vocabulary indices, such that product quantization may allow for refinement as to what a local descriptor describes (i.e., the actual feature corresponding to the local descriptor). In some embodiments, a product quantization technique may include an asymmetric distance computation between local features of the query image and the selected subset of the plurality of document images.

In some embodiments, a finalized correspondence between the selected subset of the plurality of document images and the query image may be determined based on one or more of a similarity geometry check, a homographic technique, an essential matrix technique, and/or at least one of metadata information, global positioning system information, a Hough transform test, and a Hamming embedding distance. For example, one or more geometric verification techniques may be employed after product quantization. In some embodiments, a geometric verification step may include two or more filtering stages.

At step 514, the search result of the image recognition query is transmitted, e.g., to a client/user device. In some embodiments, a client/user device may be configured to obtain the search result, and present the search result via one or more input/output devices, such as via a graphical user interface of an input/output device. For example, a search result including one or more document images may be presented to a user via a graphical user interface of an input/output device.

Therefore, the embodiments herein may be useful to address various memory footprint and precision challenges associated with large-scale image recognition systems (e.g., systems that may be scaled to include a 40 million or more document image dataset while achieving accelerated image recognition search times of 5 to 10 frames per second) possibly implemented on one or more web-based servers. Multiple global signatures (e.g., VLAD global signatures) are generated for query images to improve image recognition accuracy with respect to objects that may be off-center, or that cover relatively small areas of query images or document images. A k-d tree based ranking of the document image dataset determines a nearest neighbor relationship between global signatures corresponding to each of the document images, stored in a main memory device, and the global signatures corresponding to the query image. Additional document information only for a selected subset of document images (i.e., the top ranked document images) is obtained from a persistent storage device to filter and verify the document ranking. Moreover, the entire infrastructure of large-scale image recognition systems, including the main memory and persistent storage devices, servers and user devices, can be made more efficient for processing image recognition queries due to the various embodiments.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers.

Figure 6:
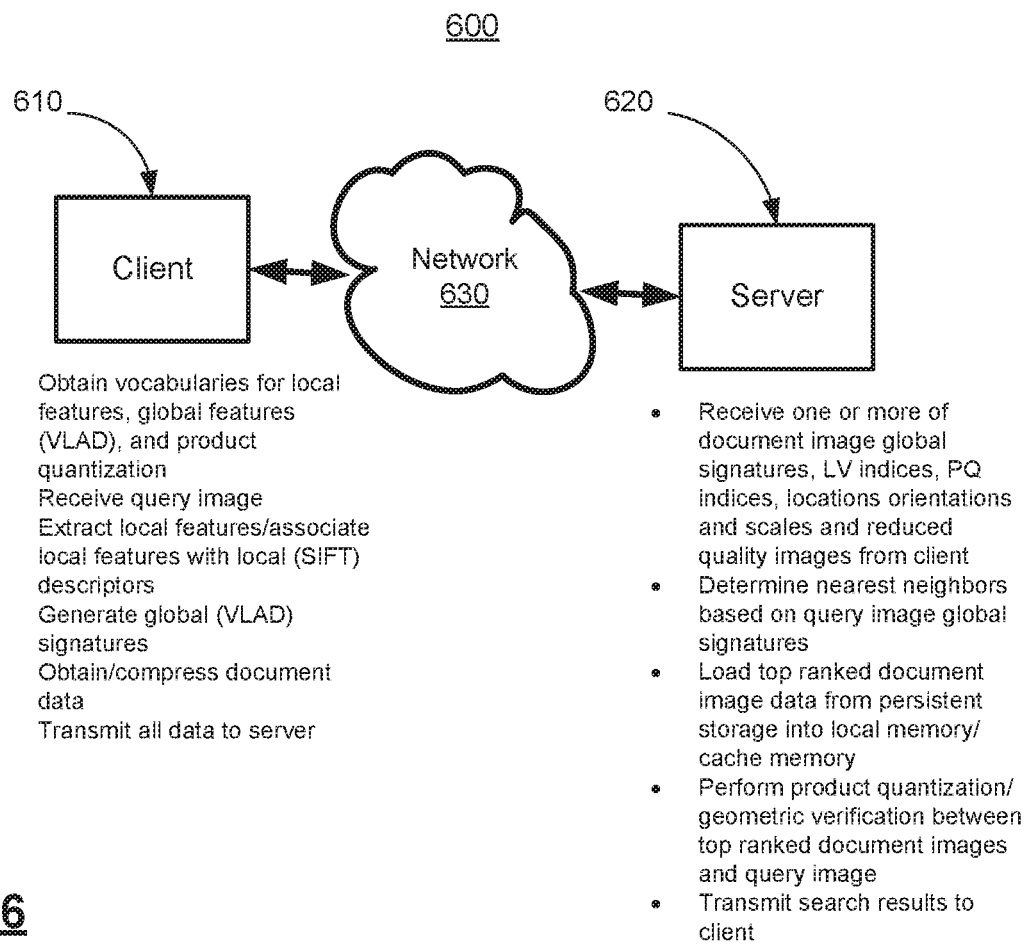
FIG. 6 illustrates a block diagram of an exemplary client-server relationship that can be used for implementing one or more aspects of the various embodiments.

A high-level block diagram of an exemplary client-server relationship that may be used to implement systems, apparatus and methods described herein is illustrated in FIG. 6. Client-server relationship 600 comprises client 610 in communication with server 620 via network 630, and illustrates one possible division of global-signature based image recognition tasks between client 610 and server 620. For example, client 610, in accordance with the various embodiments described above, may obtain vocabularies for local features, global (VLAD) features, and for product quantization. Client 610 may receive a query image, extract local features/associate local features with local (SIFT) descriptors, generate global (VLAD) signatures (e.g., for query and document images) and obtain/compress document data (e.g., reduced quality images) for communication to server 620. Server 620 may, in turn, receive the one or more query and document image global signatures, local vector (LV) indices, product quantization (PQ) indices, locations orientations and scales and reduced quality images from client 610, determine nearest neighbor relations based on the query image global signatures, load top ranked document image data from persistent storage into local memory/cache memory, perform product quantization/geometric verification between top ranked document images and the query image, and transmit search results to client 610. One skilled in the art will appreciate that the exemplary client-server relationship illustrated in FIG. 6 is only one of many client-server relationships that are possible for implementing the systems, apparatus, and methods described herein. As such, the client-server relationship illustrated in FIG. 6 should not, in any way, be construed as limiting. Examples of client devices 610 can include cell phones, kiosks, personal data assistants, tablets, toys, vehicles, web cameras, or other types of computer devices.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 1B, 3 and 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
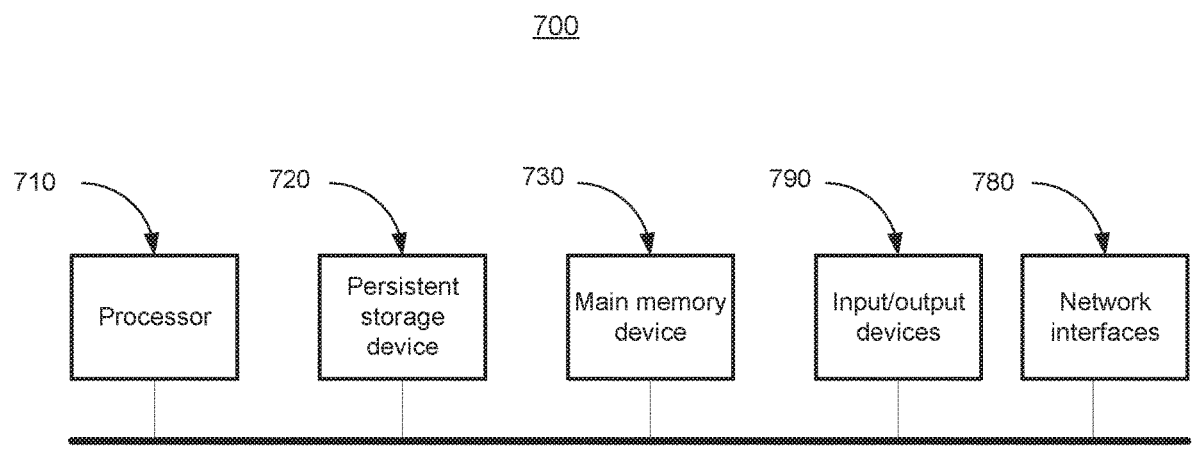
FIG. 7 illustrates a block diagram of a distributed computer system that can be used for implementing one or more aspects of the various embodiments.

A high-level block diagram of an exemplary apparatus that may be used to implement systems, apparatus and methods described herein is illustrated in FIG. 7. Apparatus 700 comprises a processor 710 operatively coupled to a persistent storage device 720 and a main memory device 730. Processor 710 controls the overall operation of apparatus 700 by executing computer program instructions that define such operations. The computer program instructions may be stored in persistent storage device 720, or other computer-readable medium, and loaded into main memory device 730 when execution of the computer program instructions is desired. For example, vocabulary module 220, descriptor engine 210, signature engine 230 and recognition engine 420 may comprise one or more components of computer 700. Thus, the method steps of FIGS. 1B, 3 and 5 can be defined by the computer program instructions stored in main memory device 730 and/or persistent storage device 720 and controlled by processor 710 executing the computer program instructions. For example, the computer program instructions can be implemented as computer executable code programmed by one skilled in the art to perform an algorithm defined by the method steps of FIGS. 1B, 3 and 5. Accordingly, by executing the computer program instructions, the processor 710 executes an algorithm defined by the method steps of FIGS. 1B, 3 and 5. Apparatus 700 also includes one or more network interfaces 780 for communicating with other devices via a network. Apparatus 700 may also include one or more input/output devices 790 that enable user interaction with apparatus 700 (e.g., display, keyboard, mouse, speakers, buttons, etc.).

Processor 710 may include both general and special purpose microprocessors, and may be the sole processor or one of multiple processors of apparatus 700. Processor 710 may comprise one or more central processing units (CPUs), for example. Processor 710, persistent storage device 720, and/or main memory device 730 may include, be supplemented by, or incorporated in, one or more application-specific integrated circuits (ASICs) and/or one or more field programmable gate arrays (FPGAs).

Persistent storage device 720 and main memory device 730 each comprise a tangible non-transitory computer readable storage medium. Persistent storage device 720, and main memory device 730, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 790 may include peripherals, such as a printer, scanner, display screen, etc. For example, input/output devices 790 may include a display device such as a cathode ray tube (CRT), plasma or liquid crystal display (LCD) monitor for displaying information (e.g., an image recognition search result) to a user, a keyboard, and a pointing device such as a mouse or a trackball by which the user can provide input to apparatus 700.

Any or all of the systems and apparatus discussed herein, including vocabulary module 220, descriptor engine 210, signature engine 230 and recognition engine 420 may be performed by, and/or incorporated in, an apparatus such as apparatus 700.

One skilled in the art will recognize that an implementation of an actual computer or computer system may have other structures and may contain other components as well, and that FIG. 7 is a high level representation of some of the components of such a computer for illustrative purposes.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A computer-based method for conducting an image recognition search, comprising:
   obtaining, by a computing device, one or more global signatures for a query image, wherein a global signature is a full image descriptor that can represent an entire image, and wherein the one or more global signatures includes a machine learning signature;
   determining, by the computing device, a ranking order for a plurality of document images based on nearest neighbor relations between document signatures corresponding to the plurality of document images and each one of the one or more global signatures for the query image;
   selecting, by the computing device, a subset of the plurality of document images based on the determined ranking order;
   obtaining, by the computing device, additional document data corresponding to the selected subset of the plurality of document images, wherein the obtained additional document data comprises, for each document image of the selected subset of the plurality of document images, an at least partially compressed data set that includes a global signature of the document image and, for each local feature of the document image, one or more of (1) an indication of at least one of a location, orientation and scale, and (2) an indication of at least one of a 3D location and a surface normal of the 3D location; and
   generating, by the computing device, a search result of document images filtered by using a geometric verification between the additional document data corresponding to the selected subset of the plurality of document images and the query image, wherein the geometric verification, using a distance check threshold, compares at least a portion of the at least partially compressed data set for each document image of the selected subset of the plurality of document images with a feature descriptor from the query image.

2. The computer-based method of claim 1, further comprising transmitting the search result in response to an image recognition query.

3. The computer-based method of claim 1, wherein the geometric verification is based on a product quantization technique.

4. The computer-based method of claim 3, wherein the product quantization technique includes an asymmetric distance computation.

5. The computer-based method of claim 1, wherein the geometric verification is based on a similarity geometry check.

6. The computer-based method of claim 1, wherein the geometric verification is based on a homographic technique.

7. The computer-based method of claim 1, wherein the geometric verification is based on an essential matrix technique.

8. The computer-based method of claim 1, wherein the geometric verification is based on at least one of metadata information, global positioning system information, a Hough transform test, and a Hamming embedding distance.

9. The computer-based method of claim 1, wherein the geometric verification includes a plurality of filtering stages.

10. The computer-based method of claim 1, wherein the additional document data for each one of the selected subset of the plurality of document images includes, for each document image, one or more of an image ID, a data type indicator and a global image signature.

11. The computer-based method of claim 10, wherein the image ID is no more than 8 bytes.

12. The computer-based method of claim 10, wherein the global image signature is no more than 64 bytes.

13. The computer-based method of claim 10, wherein the data type indicator is no more than 1 byte.

14. The computer-based method of claim 1, wherein the additional document data for each one of the selected subset of the plurality of document images includes, for each local feature of a document image, one or more of a cluster index and a PQ index.

15. The computer-based method of claim 14, wherein the cluster index is no more than 4 bytes.

16. The computer-based method of claim 14, wherein the PQ index is no more than 4 bytes.

17. The computer-based method of claim 14, wherein the indication of at least one of a location, orientation and scale is no more than 16 bytes.

18. The computer-based method of claim 14, wherein the indication of at least one of a 3D location and a surface normal of the 3D location is no more than 4 bytes.

19. The computer-based method of claim 1, wherein the nearest neighbor relations are based on Euclidean distance.

20. The computer-based method of claim 1, wherein the ranking order is determined using a k-d tree ranking technique.

21. The computer-based method of claim 1, wherein a number of document images in the selected subset of the plurality of document images is between 300 and 500 document images, inclusive.

22. The computer-based method of claim 1, wherein the document signatures are vector of locally aggregated descriptors (VLAD) global signatures.

23. The computer-based method of claim 1, wherein obtaining the one or more global signatures for the query image includes:
    obtaining associated visual words for each of a plurality of local descriptors for the query image; and
    generating the one or more global signatures for the query image based on the associated visual words.

24. The computer-based method of claim 23, wherein the plurality of local descriptors are one of scale-invariant feature transform (SIFT) descriptors, Fast Retina Keypoint (FREAK) descriptors, Histograms of Oriented Gradient (HOG) descriptors, Speeded Up Robust Features (SURF) descriptors, DAISY descriptors, Binary Robust Invariant Scalable Keypoints (BRISK) descriptors, FAST descriptors, Binary Robust Independent Elementary Features (BRIEF) descriptors, Harris Corners descriptors, Edges descriptors, Gradient Location and Orientation Histogram (GLOH) descriptors, Electrooculography (EOG) descriptors or Transform Invariant Low-rank Textures (TILT) descriptors.

25. The computer-based method of claim 1, wherein the one or more global signatures are obtained along with an image recognition query.

26. The computer-based method of claim 1, wherein the one or more global signatures are VLAD global signatures.

27. The computer-based method of claim 1, wherein at least some of the one or more global signatures are generated using local descriptors corresponding to different cropped versions of the query image.

28. The computer-based method of claim 1, wherein the selected subset of the plurality of document images includes a proportion of document images in relation to the plurality of document images, based at least in part on the total number of document images in the plurality of document images, memory footprint considerations, or document retrieval time considerations.

29. The computer-based method of claim 1, wherein the one or more global signatures includes a deep learning signature.

30. A system for conducting an image recognition search, comprising:
    a processor;
    a main memory device;
    a persistent storage device; and
    a recognition engine executable on the processor according to software instructions stored in at least one of the main memory device and the persistent storage device, the software instructions, when executed, causing the processor to:
        obtain one or more global signatures for a query image, wherein a global signature is a full image descriptor that can represent an entire image, and wherein the one or more global signatures includes a machine learning signature;
        determine a ranking order for the plurality of document images based on nearest neighbor relations between the document signatures corresponding to a plurality of document images from the main memory device and each one of the one or more global signatures for the query image;
        select a subset of the plurality of document images based on the determined ranking order,
        load into the main memory device additional document data corresponding to the selected subset of the plurality of document images from the persistent storage device, wherein the loaded additional document data comprises, for each document image of the selected subset of the plurality of document images, an at least partially compressed data set that includes a global signature of the document image and, for each local feature of the document image, one or more of (1) an indication of at least one of a location, orientation and scale, and (2) an indication of at least one of a 3D location and a surface normal of the 3D location; and
        generate a search result of document images filtered by using a geometric verification between the additional document data and the query image, wherein the geometric verification, using a distance check threshold, compares at least a portion of the at least partially compressed data set for each document image of the selected subset of the plurality of document images with a feature descriptor from the query image.

31. The system of claim 30, wherein the selected subset of the plurality of document images includes a proportion of document images in relation to the plurality of document images, based at least in part on the total number of document images in the plurality of document images, memory footprint considerations, or document retrieval time considerations.

32. The system of claim 30, wherein the one or more global signatures includes a deep learning signature.

33. A computer program product embedded in a non-transitory computer readable medium comprising instructions executable by a computer processor for conducting an image recognition search, which, when executed by a processor, cause the processor to perform one or more steps comprising:
    obtaining one or more global signatures for a query image, wherein a global signature is a full image descriptor that can represent an entire image, and wherein the one or more global signatures includes a machine learning signature;

determining a ranking order for a plurality of document images based on nearest neighbor relations between document signatures corresponding to the plurality of document images and each one of the one or more global signatures for the query image;

selecting a subset of the plurality of document images based on the determined ranking order;

obtaining additional document data corresponding to the selected subset of the plurality of document images, wherein the obtained additional document data comprises, for each document image of the selected subset of the plurality of document images, an at least partially compressed data set that includes a global signature of the document image and, for each local feature of the document image, one or more of (1) an indication of at least one of a location, orientation and scale, and (2) an indication of at least one of a 3D location and a surface normal of the 3D location; and generating a search result of document images filtered by using a geometric verification between the additional document data corresponding to the selected subset of the plurality of document images and the query image, wherein the geometric verification, using a distance check threshold, compares at least a portion of the at least partially compressed data set for each document image of the selected subset of the plurality of document images with a feature descriptor from the query image.

34. The computer program product of claim 33, wherein the selected subset of the plurality of document images includes a proportion of document images in relation to the plurality of document images, based at least in part on the total number of document images in the plurality of document images, memory footprint considerations, or document retrieval time considerations.

35. The computer program product of claim 33, wherein the one or more global signatures includes a deep learning signature.

36. A system for conducting an image recognition search, comprising:

means for obtaining one or more global signatures for a query image, wherein a global signature is a full image descriptor that can represent an entire image, and wherein the one or more global signatures includes a machine learning signature;

means for determining a ranking order for a plurality of document images based on nearest neighbor relations between document signatures corresponding to the plurality of document images and each one of the one or more global signatures for the query image;

means for selecting a subset of the plurality of document images based on the determined ranking order;

means for obtaining additional document data corresponding to the selected subset of the plurality of document images, wherein the obtained additional document data comprises, for each document image of the selected subset of the plurality of document images, an at least partially compressed data set that includes a global signature of the document image and, for each local feature of the document image, one or more of (1) an indication of at least one of a location, orientation and scale, and (2) an indication of at least one of a 3D location and a surface normal of the 3D location; and means for generating a search result of document images filtered by using a geometric verification between the additional document data and the query image, wherein the geometric verification using a distance check threshold compares at least a portion of the at least partially compressed data set for each document image of the selected subset of the plurality of document images with a feature descriptor from the query image.

37. The system of claim 36, wherein the selected subset of the plurality of document images includes a proportion of document images in relation to the plurality of document images, based at least in part on the total number of document images in the plurality of document images, memory footprint considerations, or document retrieval time considerations.

38. The system of claim 36, wherein the one or more global signatures includes a deep learning signature.

* * * * *